(12) United States Patent
Wu

(10) Patent No.: US 6,508,425 B2
(45) Date of Patent: Jan. 21, 2003

(54) ONE-WAY PEPPER GRINDING TOOL

(75) Inventor: Hua-Te Wu, Tainan (TW)

(73) Assignee: Yienn Lih Enterprises Co., Ltd., Tainan (TW)

( * ) Notice: Subject to any disclaimer, the term of this patent is extended or adjusted under 35 U.S.C. 154(b) by 1 day.

(21) Appl. No.: 09/824,824

(22) Filed: Apr. 4, 2001

(65) Prior Publication Data

US 2002/0145064 A1 Oct. 10, 2002

(51) Int. Cl.[7] ................................................. A47J 42/00
(52) U.S. Cl. .................................................... 241/169.1
(58) Field of Search .............................. 241/168, 169.1, 241/169.2, 169

(56) References Cited

U.S. PATENT DOCUMENTS 4,374,574 A * 2/1983 David ..................... 241/169.1
5,082,190 A * 1/1992 Chen ...................... 241/169.1
5,180,114 A * 1/1993 Chen ...................... 241/169.1

* cited by examiner

Primary Examiner—Mark Rosenbaum
(74) Attorney, Agent, or Firm—Rosenberg, Klein & Lee

(57) ABSTRACT

A one-way pepper grinding tool has an inner grinding part turnably received in a fixed outer grinding part. The inner grinding part is connected to a lower end of a shaft. The shaft is passed through a one-way member including a round turnable main body and a ratchet, and secured to a turning part of the one-way member. The main body is connected to a lever and a torsional spring such that same can be turned clockwise and counterclockwise by depressing and releasing the lever repeatedly. The ratchet will engage the turning part only when the main body is turned clockwise so the inner grinding part can turn only clockwise in the pepper grinding movement.

5 Claims, 6 Drawing Sheets

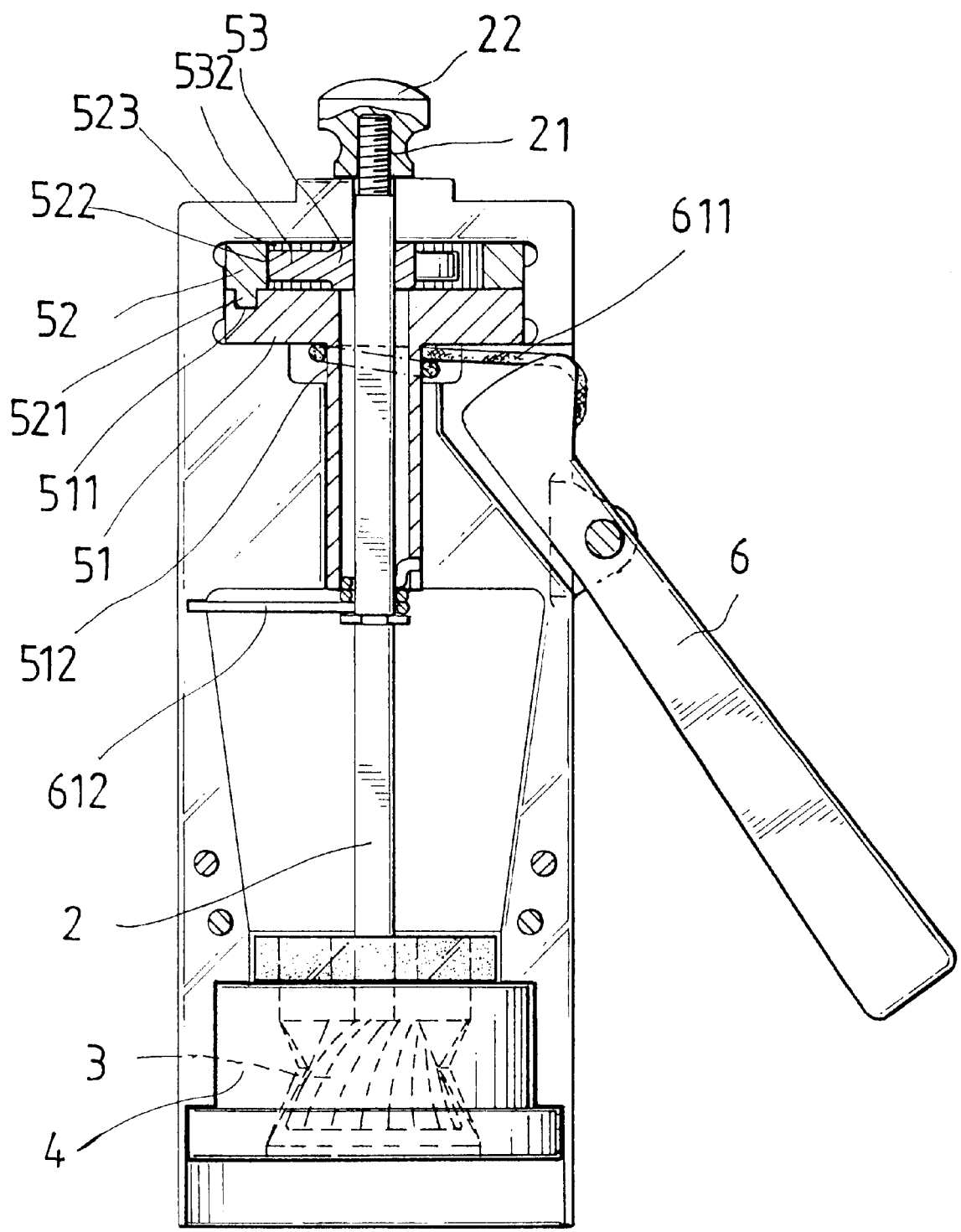
F I G. 2

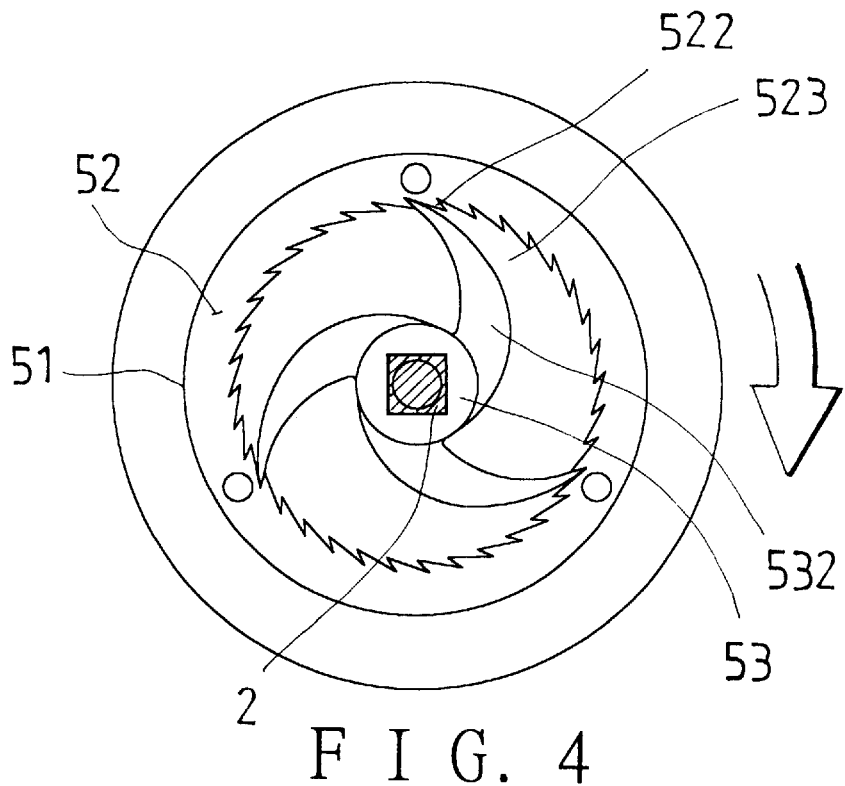
F I G. 4
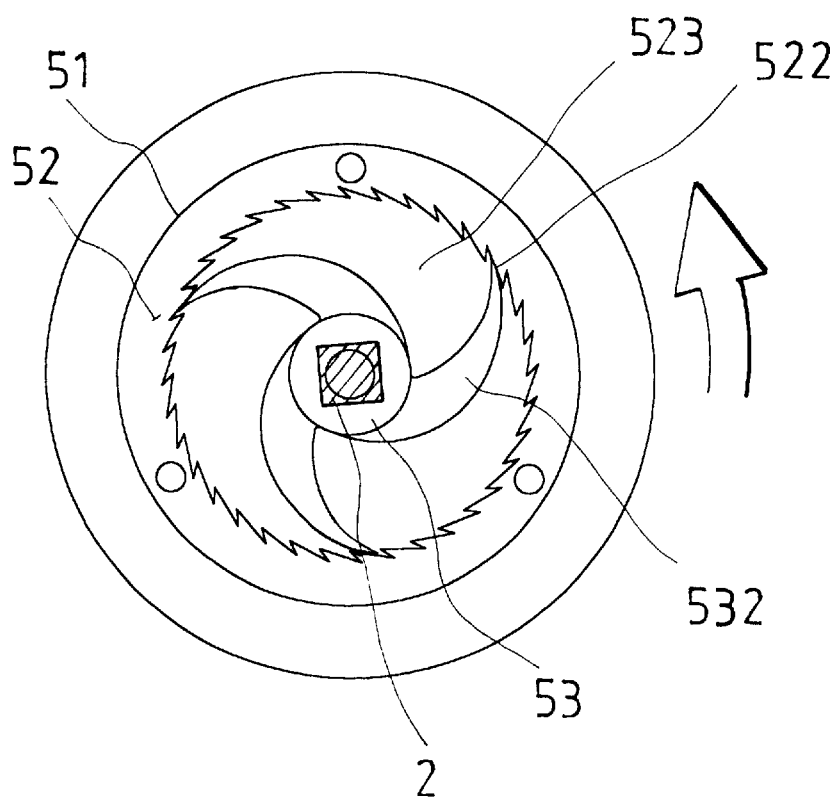
F I G. 6

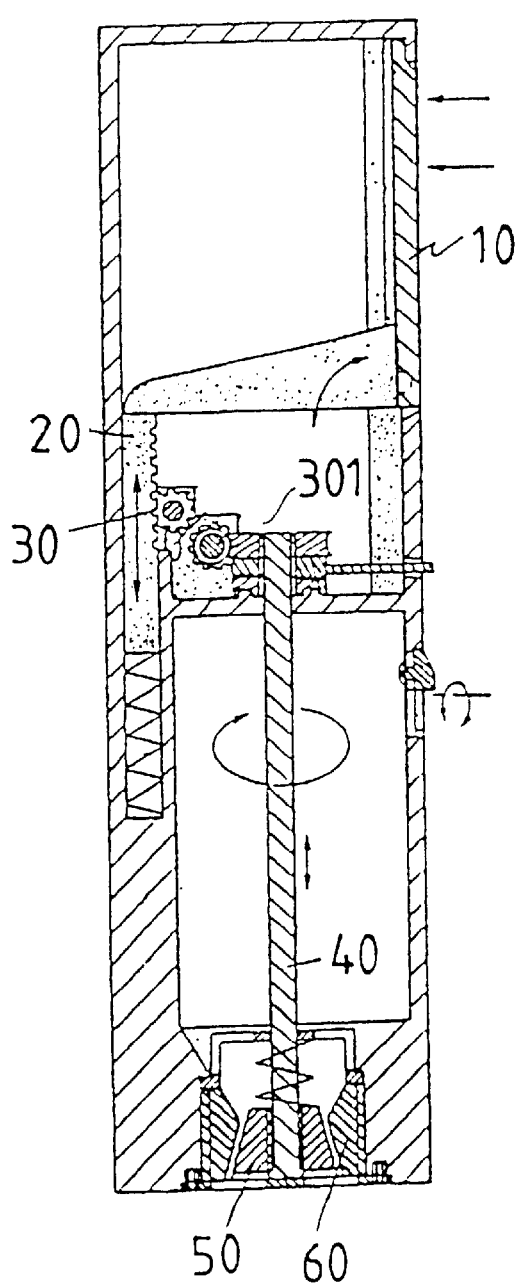
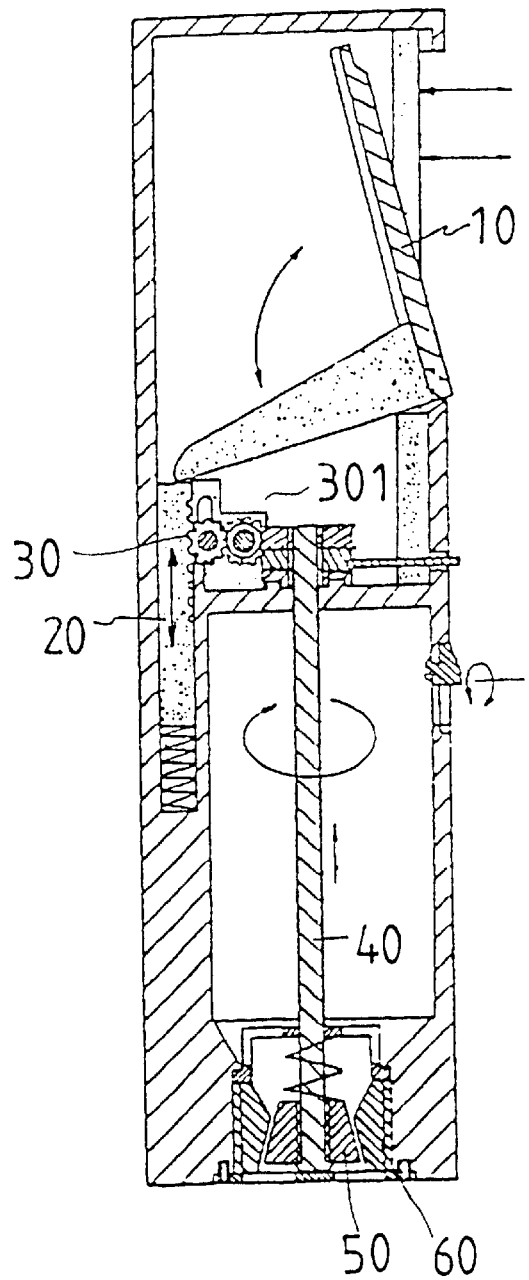
F I G. 7
(PRIOR ART)
F I G. 8
(PRIOR ART)

ONE-WAY PEPPER GRINDING TOOL

BACKGROUND OF THE INVENTION

The present invention relates to a pepper grinding tool which has an inner grinding part turnably received in an outer grinding part to grind pepper in between, and particularly to one, of which the inner grinding part can only turn in one direction.

Referring to FIGS. 7 and 8, a conventional pepper tool, with British Patent No. 2256378, has a pressing block 10, a tooth bar 20, a gear wheel 30, a gear cluster 301, a shaft 40, an inner grinding part 50 and an outer grinding part 60.

The pressing block 10 is depressable to move the toothed bar 20 downwards; when the pressing block 10 is released, the toothed bar 20 is biased up by an elastic member. The gear wheel 30 is connected to the toothed bar 20 and the gear cluster 301. The shaft 40 is connected to gear cluster 301 and the inner grinding part 50 such that when the toothed bar 20 is moved up and down, the inner grinding part 50 can be turned by means of the gear wheel 30, the gear cluster 301 and the shaft 40.

The inner grinding part 50 is disposed in the outer grinding part 60 which is fixedly disposed in the pepper grinding tool.

Thus, the inner grinding part 50 can turn relative to the outer grinding part 60 to grind pepper in between.

However, the pepper grinding tool is found to have a disadvantage that the inner grinding part 50 turns in one direction when the pressing block 10 is depressed, and the other direction when the pressing block is released, making the grinding movement not relatively smooth, especially when there are relatively big pepper granules between the grinding parts 50 and 60.

SUMMARY OF THE INVENTION

Therefore, it is a main object of the present invention to provide a pepper grinding tool, of which the inner grinding part can turn relative to the outer grinding part in only one direction to make a relatively smooth grinding movement.

The pepper grinding tool of the present invention includes a housing member, a grinding assembly and a one-way member.

The grinding assembly has an inner grinding part and an outer grinding part. The outer grinding part is fixedly received in the housing member. The inner grinding part is turnably received in the outer part for permitting pepper to be ground in between.

The one-way member includes a main body, a ratchet, and a turning part. A shaft is passed through the main body and the ratchet, and is secured to the turning part from an upper end. The shaft is connected to the inner grinding part from a lower part. The turning part is disposed between teeth on an inner side of the ratchet; the ratchet is secured to the main body; the teeth of the ratchet engage the turning part when the ratchet turns clockwise in order for the inner grinding part to turn to grind pepper, the teeth can't engage the turning part when the ratchet turns counterclockwise.

The main body of the one-way member is operationally connected to an operation lever and a torsional spring such that the main body can be turned by depressing and releasing the lever repeatedly. By depressing and releasing the lever repeatedly, the turning part, the shaft, and the inner grinding part connected to the turning part can turn and in only one direction in the pepper grinding movement.

BRIEF DESCRIPTION OF THE DRAWINGS

This invention will be better understood by referring to the accompanying drawings, wherein:

FIG. 2 is a cross-sectional view of the one-way pepper grinding tool of the present invention.

FIG. 4 is a top view of the one-way member of the pepper grinding tool according to the present invention.

FIG. 6 is a top view of the one-way member according to the present invention under movement.

FIG. 7 is a cross-sectional view of the pepper grinding tool in the Background.

FIG. 8 is a view of the pepper grinding tool of FIG. 7 under grinding movement.

DETAILED DESCRIPTION OF THE PREFERRED EMBODIMENT

Figure 1:
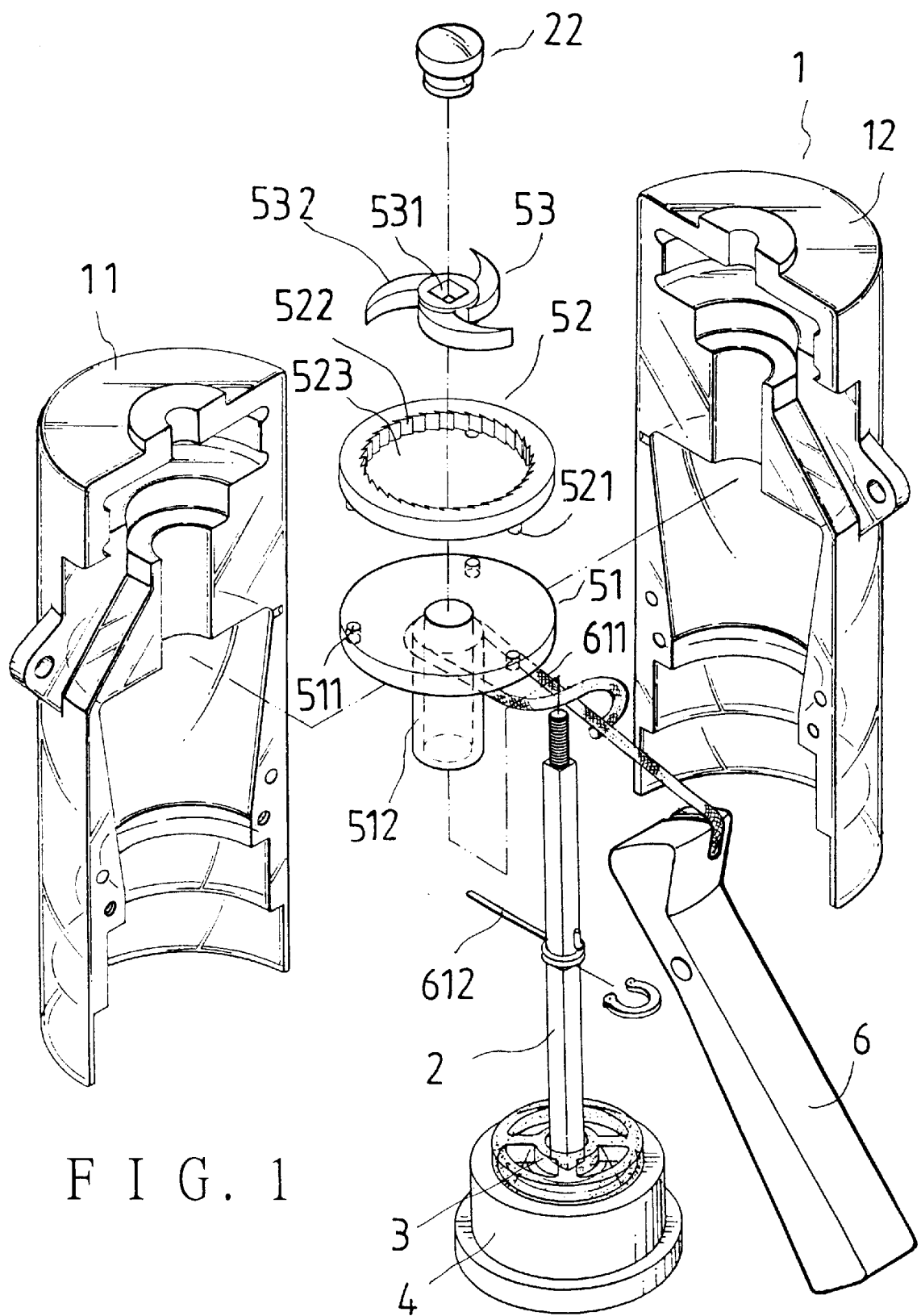
FIG. 1 is an exploded perspective view of the one-way pepper grinding tool of the present invention.
Figure 3:
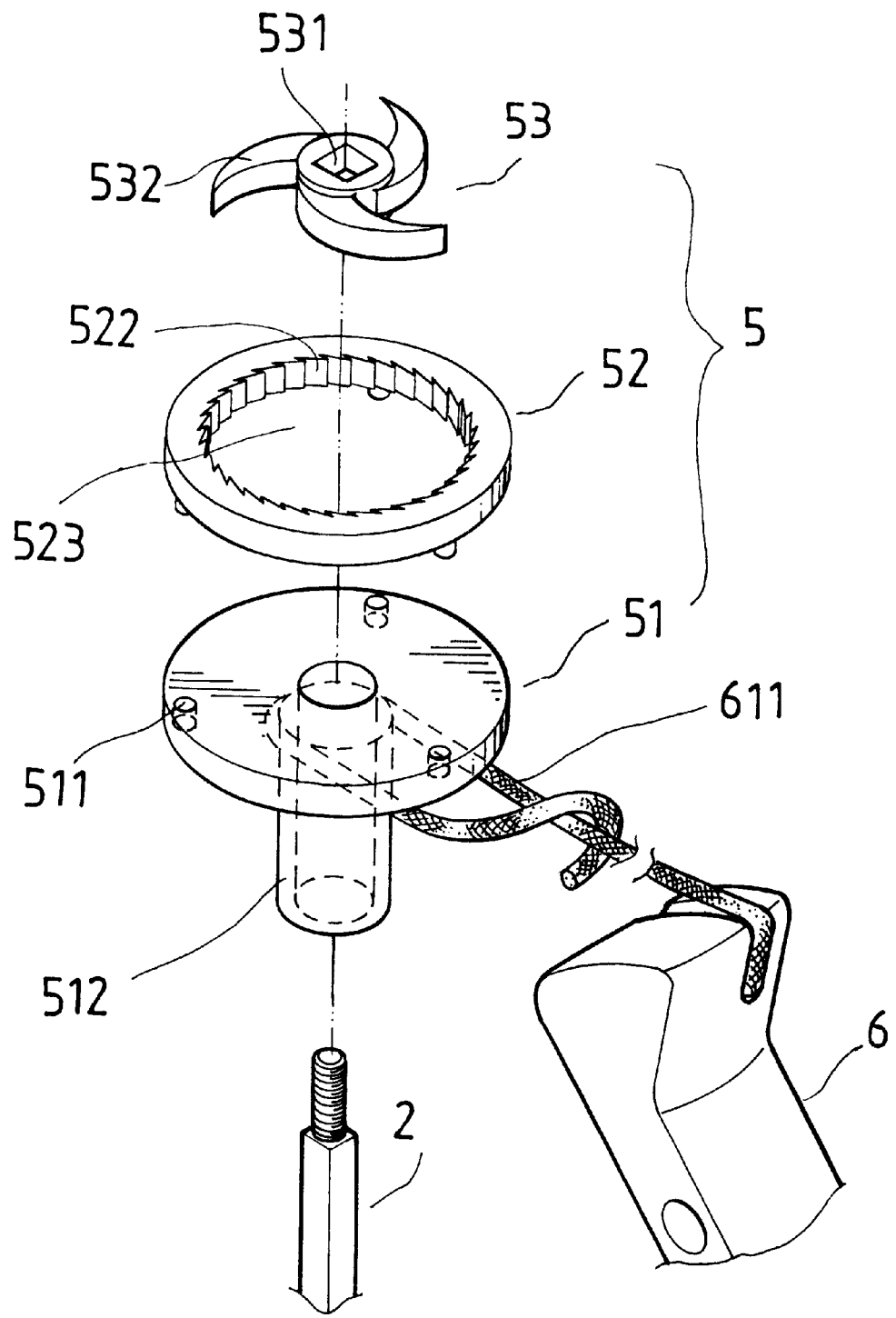
FIG. 3 is an exploded perspective view of the one-way member of the pepper grinding tool according to the present invention.

Referring to FIGS. 1, 2, 3 and 4, a one-way pepper grinding tool of the present invention includes a housing member 1, a shaft 2, an inner grinding part 3, an outer, grinding part 4, a one-way member 5, an operation lever 6, a string 611 and a torsional spring 612.

The housing member 1 has a left part 11, and a right part 12, which can form a receiving room when combined in order to receive the grinding parts 3 and 4, the one-way member 6 and the shaft, etc.

The shaft 2 has a polygonal cross-section, and is connected to the inner grinding part 3 from a lower end portion. The inner grinding part 3 is turnably received in the outer grinding part 4 such that pepper can be ground in between when the inner grinding part 3 is turned.

The one-way member 5 has a round main body 51, a ratchet 52 and a turning part 53. The main body 51 is turnably received in the housing member 1; the shaft 2 is passed through a central hole of the main body 51. The main body 51 further has engaging holes 511 on an upper side.

The ratchet 52 has engaging protrusions 521 on a lower side, teeth 522 on an inner side and a central hole 523. The ratchet 52 is connected to the main body 51 with the engaging protrusions 521 being each passed into a corresponding one of the engaging holes 511 of the main body 51.

The turning part 53 has a polygonal central hole 531 and several engaging blocks 532. The polygonal central hole 531 and the cross-section of the shaft 2 have the same shape. The turning part 53 is received in the central hole 523 of the ratchet 52 with the central hole 531 being connected to the shaft 2; the teeth 522 of the ratchet 52 will engage the engaging blocks 532 of the turning part 53 when the ratchet 52 turns clockwise (in a first direction), and they won't engage same when the ratchet 52 turns counterclockwise (in a second direction). A nut 22 is connected to an upper threaded end portion of the shaft 2 to prevent the turning part 53 from falling off the ratchet 52.

The torsional spring 612 is connected to both the main body 51 of the one-way member 5 and an inner side of the housing member 1 for permitting the torsional spring 612 to bias the main body 51 back to an original position when same is released after turning.

Figure 5:
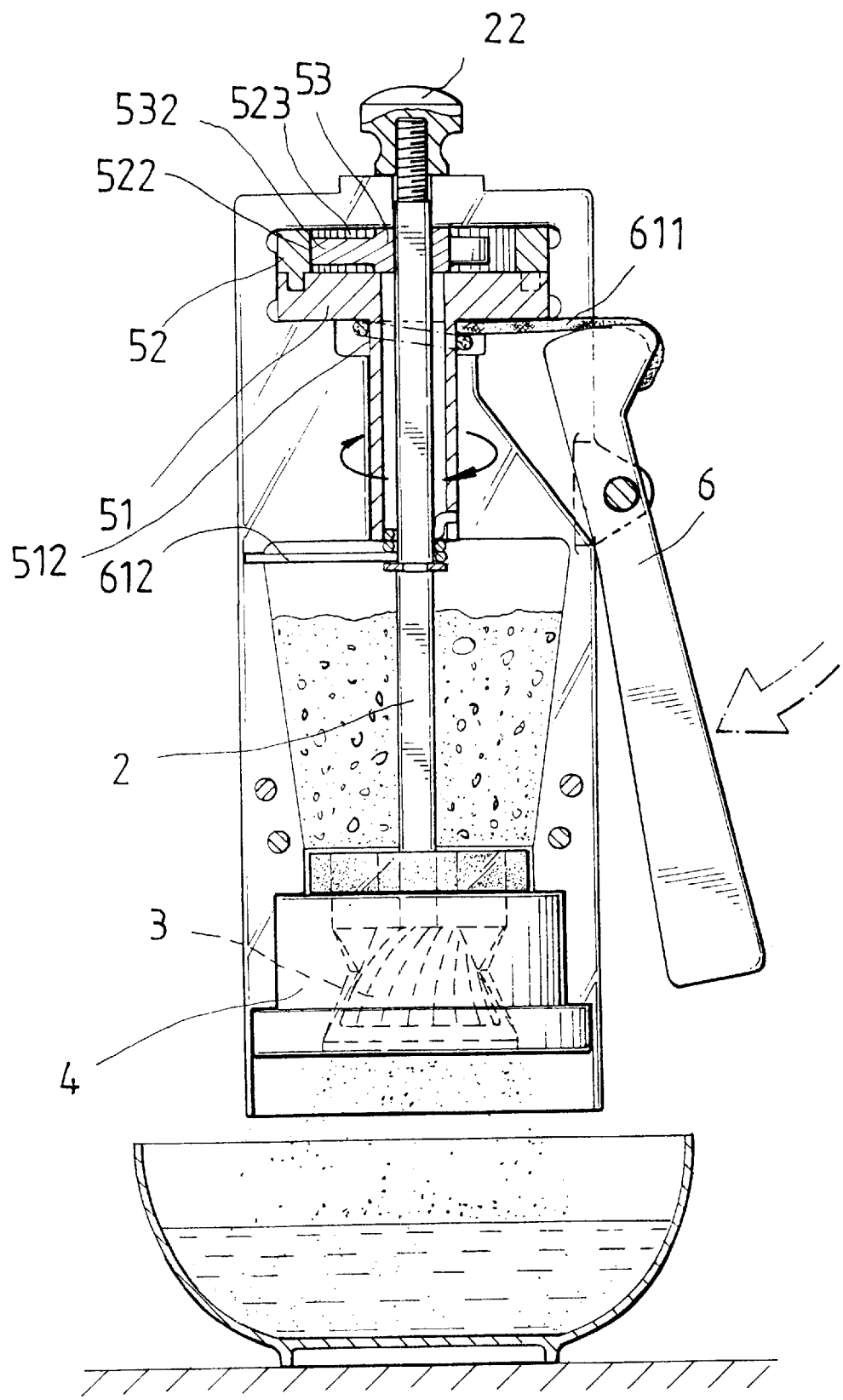
FIG. 5 is a view of the one-way pepper grinding tool in FIG. 1 under grinding movement.

The operation lever 6 is pivoted to the housing member 1 from an intermediate portion. Referring specifically to FIG. 5, the string 611 is connected to an upper end of the operation lever 6 from one end, and is passed around, and connected to, a lower part 512 of the main body 51 from the other end such that the main body 51, and the ratchet 52 connected to the main body 51 can be turned clockwise when the operation lever 6 is depressed from a lower end portion; the main body 51 and the ratchet 52 can be turned counterclockwise by the torsional spring 612 when the operation lever 6 is released after the depressing movement.

In using the one-way pepper grinding tool to grind pepper, referring to FIGS. 4, 5 and 6, when the operation lever 6 is depressed from the lower end portion, the string 611 is pulled, forcing the main body 51 and the ratchet 52 to turn clockwise (FIG. 4) with the teeth 522 of the ratchet 52 engaging the engaging blocks 532 of the turning part 53; thus, the turning part 53, the shaft 2 and the; inner grinding part 3 are turned for permitting pepper to be ground between the inner grinding part 3 and the outer grinding part 4.

When the operation lever 6 is released after the depressing movement, the torsional spring 612 forces the main body 51 and the ratchet 52 to turn counterclockwise, but the teeth 522 don't engage the engaging blocks 532 of the turning part 53; consequently, the turning part 53, the shaft 2 and the inner grinding part 3 are not turned. Therefore, the inner grinding part 3 can turn in only one direction.

From the above description, the one-way pepper grinding tool of the present invention can be known to have desirable features as follows:

1. Being capable of turning in only one direction, the inner grinding part can move relatively smoothly in grinding pepper even when there are relatively big pepper granules.
2. The one-way pepper grinding too 1 can provide a stepless movement in grinding pepper, while the conventional pepper grinding in the Background can't.

What is claimed is:

1. A one-way pepper grinding tool, comprising a one-way member, said one-way member having a round main body turnably received in a housing member of said pepper grinding tool; said one-way member having a ratchet connected to said main body; said ratchet having teeth on an inner side for engaging a turning part disposed in said ratchet when said ratchet is turned clockwise; said teeth of said ratchet being not capable of engaging said turning part when said ratchet is turned counterclockwise; said turning part being secured to an upper end portion of a shaft connected to an inner grinding part turnably received in an outer grinding part; said main body of said one-way member being operationally connected to an operation lever and a torsional spring for permitting same to be turned clockwise when said operation lever is depressed, and to be turned counterclockwise by means of said torsional spring when said lever is released from said depressing action; whereby said inner grinding part turns clockwise relative to said outer grinding part to grind pepper in between when said lever is depressed and released repeatedly.

2. The one-way pepper grinding tool as claimed in claim 1, wherein said turning part has a central hole for said upper end portion of said shaft to be securely passed through and a plurality of engaging blocks engaging said teeth of said ratchet responsive to said ratchet being turned in a clockwise direction.

3. The one-way pepper grinding tool as claimed in claim 1, wherein a nut is connected to an upper threaded end of said shaft to prevent said turning part from falling off said ratchet.

4. The one-way pepper grinding tool as claimed in claim 1, wherein a string is passed around, and connected to said main body of said one-way member from one end, and connected to an upper end of said operation lever, and said operation lever is pivoted to said housing member from an intermediate portion.

5. The one-way pepper grinding tool as claimed in claim 1, wherein said ratchet includes a plurality of engaging protrusions on a lower side, each of said engaging protrusions being inserted into a corresponding one of engaging holes on an upper side of said main body.

* * * * *